(12) United States Patent
Harrison

(10) Patent No.: US 7,380,405 B2
(45) Date of Patent: Jun. 3, 2008

(54) AIR CONDITIONING SYSTEM

(76) Inventor: Thomas D. Harrison, 1767 E. Auburn Ridge La., Draper, UT (US) 84020

( * ) Notice: Subject to any disclaimer, the term of this patent is extended or adjusted under 35 U.S.C. 154(b) by 0 days.

(21) Appl. No.: 11/678,785

(22) Filed: Feb. 26, 2007

(65) Prior Publication Data

US 2007/0204641 A1  Sep. 6, 2007

Related U.S. Application Data

(60) Division of application No. 11/468,555, filed on Aug. 30, 2006, now Pat. No. 7,216,495, and a continuation-in-part of application No. 11/456,199, filed on Jul. 8, 2006, now Pat. No. 7,260,947.

(60) Provisional application No. 60/813,611, filed on Mar. 2, 2006.

(51) Int. Cl.
*B60H 1/32* (2006.01)
(52) U.S. Cl. .......................... 62/133; 62/239; 62/323.1
(58) Field of Classification Search .................. 62/133, 62/239–244, 208, 214, 323.1
See application file for complete search history.

(56) References Cited

U.S. PATENT DOCUMENTS

| | | | |
|---|---|---|---|
| 3,186,184 A | 6/1965 | Pruitt | |
| 3,459,006 A | 8/1969 | Hoyer | |
| 3,977,650 A | 8/1976 | Berggren | |
| 4,425,765 A | 1/1984 | Fukushima et al. | |
| 4,473,753 A | 9/1984 | Izumi et al. | |
| 4,590,767 A | 5/1986 | Gardner, Jr. | |
| 4,596,121 A | 6/1986 | Ogata | |
| 4,733,540 A | 3/1988 | Sakurai | |
| 4,753,078 A | 6/1988 | Gardner, Jr. | |
| 5,125,469 A | 6/1992 | Scott | |
| 5,327,987 A | 7/1994 | Abdelmalek | |
| 5,408,840 A | 4/1995 | Talley | |
| 5,983,650 A | 11/1999 | Ando et al. | |
| 6,251,044 B1 | 6/2001 | Streib | |

(Continued)

OTHER PUBLICATIONS

BMW at the Mondial de l'Automobile Paris 2006 [online] Oct. 2006 [retrieved on Nov. 13, 2006]; 4 pgs.; Retrieved from the Internet: URL: http://www.automotoportal.com/article/bmw-at-the-mondial-de-lautomobile-paris-2006.

(Continued)

*Primary Examiner*—William E Tapolcai
(74) *Attorney, Agent, or Firm*—Workman Nydegger

(57) ABSTRACT

Implementations of the present invention include systems, methods, and apparatus for improving the fuel efficiency (mpg/kpl) of a motor vehicle during those times when the vehicle air conditioning system is operating. Whenever the driver takes his foot off the gas, or the vehicle engine is otherwise caused to decelerate, the refrigerant compressor clutch engages, allowing the compressor to operate on previously-imparted vehicle waste energy (e.g., imparted by the engine, or by downhill travel.) When the refrigerant pressure reaches a pre-set maximum value, the clutch is deactivated, and the compressor stops. When the refrigerant pressure reaches a pre-set minimum level, the clutch is activated regardless of the existence of vehicle waste energy. When the refrigerant pressure reaches another pre-set level between the aforementioned maximum and minimum levels, in the absence of any vehicle waste energy, the clutch is again deactivated and the compressor stops.

15 Claims, 5 Drawing Sheets

U.S. PATENT DOCUMENTS

| | | |
|---|---|---|
| 6,586,186 B2 | 7/2003 | Lipshurz et al. |
| 6,840,055 B2 | 1/2005 | Iritani |
| 7,017,360 B2 | 3/2006 | Kotwicki et al. |
| 7,096,680 B2 | 8/2006 | Sugesawa et al. |
| 7,100,383 B2 | 9/2006 | Sugesawa et al. |
| 7,143,596 B2 | 12/2006 | Yonekura et al. |
| 7,146,960 B2 | 12/2006 | Phlips et al. |
| 2003/0213252 A1 | 11/2003 | Kuribayashi |
| 2004/0079098 A1 | 4/2004 | Uno et al. |
| 2004/0168454 A1 | 9/2004 | Iritani |
| 2005/0044873 A1 | 3/2005 | Tamai et al. |

OTHER PUBLICATIONS

BMW EfficientDynamics [online] Sep. 19, 2006 [retrieved on Nov. 13, 2006]; 10 pgs.; Retrieved from the Internet: URL: http://www.worldcarfans.com/news.cfm/newsID/2050919.006/page/1/country/gcf/lang/eng/bmw/bmw-efficientdynamics.

BMW Biturbo Petrol Inline Six Engine In Depth [online] Apr. 26, 2006 [retrieved on Nov. 13, 2006]; 26 pgs.; Retrieved from the Internet: URL: http://www.worldcarfans.com/news.cfm/newsID/2060426.001/page/1/country/gcf/lang/eng/bmw/bmw-3.0-litre-engine-in-depth.

Office Action mailed Jan. 30, 2007 (Paper No. 20070125), U.S. Appl. No. 11/468,555, filed Aug. 30, 2006.

Office Action mailed Feb. 1, 2007 (Paper No. 20070123), U.S. Appl. No. 11/456,199, filed Jul. 8, 2006.

Office Action mailed Jul. 17, 2007 (Paper No. 20070618), U.S. Appl. No. 11/531,642, filed Sep. 13, 2006.

AIR CONDITIONING SYSTEM

CROSS-REFERENCE TO RELATED APPLICATIONS

The present invention is a Divisional Application of U.S. patent application Ser. No. 11/468,555, filed on Aug. 30, 2006 now U.S. Pat. No. 7,216,495, entitled "Air Conditioning System." The parent application Ser. No. 11/468,555, claims the benefit of priority to U.S. Provisional Patent Application No. 60/813,611, filed on Mar. 2, 2006, entitled "Air Conditioning System," and is a continuation-in-part of U.S. patent application Ser. No. 11/456,199, filed on Jul. 8, 2006 now U.S. Pat. No. 7,260,947, entitled "Air Conditioning System." The entire contents of the aforementioned applications are incorporated by reference herein.

BACKGROUND OF THE INVENTION

1. The Field of the Invention

The present invention relates to an automotive air conditioning system. In more particular, the present invention relates to systems, methods, and apparatus, for utilizing deceleration of an automotive engine to compress refrigerant in an air conditioning system.

2. The Relevant Technology

For the past several decades, air conditioning systems have been used in automobiles and other motor vehicles during hot weather to provide more comfortable conditions for drivers and other occupants of the motor vehicles. Traditional air conditioning systems utilize a refrigerant to cool and/or dehumidify air. The cool air is then dispersed into the passenger compartment in a manner so as to mitigate the temperature in the passenger compartment.

Traditional automotive air conditioning systems draw the power to compress the refrigerant from the engine of the motor vehicle. In one configuration, an engine fan belt pulley is connected to the engine and to the compressor of the air conditioning system. When it becomes necessary to further compress the refrigerant in the air conditioning system, a clutch (e.g., a magnetically operated clutch—"magnetic clutch") provides engagement between the compressor and the fan belt pulley. Engaging the magnetic clutch allows the fan belt pulley to provide power to the air conditioner compressor from the engine, effectively compressing the refrigerant in the system.

For example, when an air conditioner is switched to an "on" position to cool the motor vehicle's interior, the magnetically-operated clutch provides an effective engagement between the compressor and the fan belt pulley. This translates power from the engine, allowing the compressor to operate and compress the refrigerant. Once compressed to a pre-set pressure level, the compressor is disconnected from the engine, such as by disengaging the magnetic clutch. The air conditioning system then passes the compressed refrigerant through a condenser/heat exchanger and, thereafter, to an expansion valve, orifice tube, or other mechanism in the air box heat exchanger. In the air box heat exchanger, the compressed refrigerant is expanded and liquefied to thereby cool incoming air. The fresh air, once cooled, is directed into the car's interior.

Typically, a high and/or low pressure switch is utilized to identify the pressurization of the refrigerant in the air conditioning system. Pressurization of refrigerant in the air conditioning system allows for desired expansion of the refrigerant in the air box heat exchanger to cool air. Before the refrigerant passes into the air box heat exchanger, such as in the compressor or tubing between the condenser/heat exchanger and the air box heat exchanger, the refrigerant is in a high pressure state. This is often referred to as the high pressure side of the system. When the refrigerant passes into the air box heat exchanger and before being recompressed in the compressor, the refrigerant is in a low pressure state. This is often referred to as the low pressure side of the system.

The configuration of most air conditioning compressors does not require continuous actuation of the magnetic clutch, the engine fan belt, or other sources of power for the compressor. In particular, during operation of the air conditioner, operation of the heat exchanger generally needs only intermittent operation of the magnetic clutch/compressor. As the volume of refrigerant is being expanded and passed into the low pressure side of the system, the transfer of refrigerant to the low pressure side of the system increases the pressurization on the low pressure side of the system. Similarly, the volume of refrigerant that is being held on the high pressure side of the system decreases. The decrease in the volume of refrigerant decreases the pressurization of refrigerant on the high pressure side of the system.

Of course, the decrease in the pressurization on the high pressure side of the system can decrease the efficiencies of operation of the air conditioner. For example, the refrigerant may not provide optimized cooling of air in the air box heat exchanger. The state of pressurization of the refrigerant can thus be detected in a number of ways. In one conventional system, the pressurization of the refrigerant on the low pressure side of the system is monitored as an indicator of the pressurization of the refrigerant on the high pressure side of the system. For example, when the pressurization of the refrigerant on the low pressure side of the system increases to a certain level, the pressurization of the refrigerant on the high pressure side of the system is deemed to have decreased below desired levels.

When the refrigerant on the low pressure side of the system has reached certain upper pressure limits, the magnetic clutch is engaged and power from the engine is translated to the compressor. Refrigerant pulled from the low pressure side of the system is compressed by the compressor to increase pressurization of the refrigerant on the high pressure side of the system. Once the pressurization of the refrigerant on the low pressure side of the system has been reduced by operation of the compressor, the magnetic clutch is disengaged, and the engine is allowed to operate without the increased load required to drive the engine fan belt pulley.

The increase in pressurization of refrigerant on the high pressure side of the air conditioning system allows the refrigerant to be useful as it flow through the condenser/heat exchanger. In particular, the compressed refrigerant continues cooling even when the engine fan belt pulley is not in engagement with the compressor. Ultimately, however, the continual flow of refrigerant and cooling of air in the heat exchanger also results in a gradual decline in pressurization of the refrigerant in the air conditioning system.

When the refrigerant pressure reaches a preset high pressure value on the low pressure side of the system (i.e., depleted high pressure side), the low pressure side limit switch again turns the magnetic clutch back on, allowing the compressor to once again draw power from the engine pulley, and increase the pressurization of the refrigerant on the high pressure side of the system. When the refrigerant reaches the preset low pressure value on the low pressure side of the system, the low pressure limit switch again disengages the magnetic clutch and the compressor from the engine pulley.

Since the depressurization of refrigerant on the high pressure side is gradual, the ongoing air conditioning can continue to run for some time without applying a load on the motor vehicle engine. While this provides efficiencies in system operation, a number of deficiencies are also presented. For example, because the air conditioning system does not apply a continuous load to the motor vehicle engine, the default operating state of the motor vehicle is typically one in which the engine fan belt pulley is not in operation. Thus, motor vehicle engines are often designed to optimally operate in the absence of running of the engine fan belt pulley. As a result, during certain operating conditions, it can be disadvantageous for the air conditioning system to exert a load on the motor.

For example, typical compressors of air conditioning systems may not be actuated when the motor vehicle is idling, or when the temperature of the engine has exceeded certain upper temperature limits. Instead, the compressors of conventional air conditioning systems are configured to operate when the motor is in a state of acceleration or at a constant driving speed. During acceleration, increased load on the engine is expected as part of the acceleration process. While engaging of the engine fan belt pulley during acceleration may place an increased load on the engine of the motor vehicle, such increased load is typically minimal compared to the load placed on the engine during acceleration.

In other words, the design requirements which allow for acceleration of the motor vehicle engine also tends to accommodate the increased load needed to drive the engine fan belt pulley, and charge the air conditioning compressor. While utilizing acceleration cycles to power the air conditioning compressor does not present challenges in operation of the motor vehicle engine, the additional engine load imparted by the air conditioning compressor can nonetheless represent significant fuel consumption increases when compared with engine operation in the absence of such additional load.

For example, in some situations, depending on the specific heat load encountered during operation of the air conditioning system, operation of the air conditioning compressor can result in about 20-25 percent or more reduction in overall vehicle fuel efficiency (e.g., mpg, kpl, etc.) Such energy consumption implications can not only limit the fuel efficiency of the motor vehicle, but can also be quite costly when the air conditioning system is used over a period of weeks or months. Additionally, such additional energy consumption results in the burning of additional fossil fuels which correspondingly increases the total combustion exhaust expelled by the motor vehicle during operation.

BRIEF SUMMARY OF THE INVENTION

Implementations of the present invention relate to systems, methods, and apparatus for improving the vehicle fuel efficiency when compressing an air conditioner refrigerant for use in an air conditioning system of a motor vehicle. According to one or more implementations of the present invention, when the pressurization of the refrigerant of the air conditioning system drops below a desired level, it is determined whether the engine of the motor vehicle is decelerating. When the engine of the motor vehicle is decelerating, such as when the driver's foot is off the gas pedal, a pressurization system is actuated to draw power from the motor vehicle engine to charge the refrigerant (i.e., operate the air conditioning system compressor) of the air conditioning system. The pressurization system utilizes energy from the decelerating motor to increase the pressurization of the refrigerant in the air conditioning system.

According to one embodiment of the present invention, utilizing energy from the engine of the motor vehicle during deceleration to operate the air conditioning system compressor results in significant vehicle fuel efficiency gains. Drawing power from the engine during deceleration does not reduce performance of the engine output, or result in added fuel consumption, such as is experienced when a load is placed on the engine during acceleration (or while traveling at constant speeds). The load applied to the engine during deceleration can also help slow the vehicle, and can actually result in savings in braking effort, time, and force.

According to another embodiment of the present invention, when the pressurization of the refrigerant in the air conditioning system is below a desired level of pressurization and the engine is decelerating, a clutch, or other pressurization system component, can draw power from the decelerating engine. The power drawn from the decelerating engine can be utilized to increase the pressurization of the refrigerant in the air conditioning system. According to one embodiment of the present invention, the pressurization of the refrigerant in the air conditioning system is ascertained for the high pressure side of the system. Optionally, the pressurization of the refrigerant in the air conditioning system on the high pressure side of the system is monitored by determining the pressurization of the refrigerant on the low pressure side of the system. In another embodiment, the pressurization of the refrigerant on the high pressure side of the system can be monitored directly.

According to another embodiment of the present invention, a dual-mode system is provided. The dual-mode system can optionally charge the air conditioning system in the absence of a deceleration cycle while also allowing for efficient compression of the refrigerant during deceleration of the motor vehicle. For example, when the pressurization of the refrigerant on the high pressure side of the air conditioning system is less than a minimum level, the pressurization system is actuated to increase the pressurization of the refrigerant in the air conditioning system, even when the engine is not decelerating.

Optionally, when the engine is not decelerating, the refrigerant in the air conditioning system will be compressed until the pressurization reaches an intermediate value (e.g., an acceleration pressurization maximum value). The intermediate value can be less than the maximum pressurization limit to maintain capacity for additional pressurization when deceleration of the engine occurs. When the pressure in the air conditioning system is greater than the minimum level, but less than a maximum pressurization, the pressurization system is actuated only when the engine is decelerating.

As will be appreciated by those skilled in the art, a variety of types and configurations of air conditioning systems can be utilized without departing from the scope and spirit of the present invention. For example, according to one embodiment of the present invention, an efficient automotive air conditioning system is provided as part of the original auto vehicle design. According to another embodiment of the present invention, an automotive air conditioning system is provided that can be retrofit as an after market component for traditional automotive air conditioning systems.

According to another embodiment of the present invention, one or more components of the automotive air conditioning system are tailored to provide greater efficiencies in connection with a dual-mode or other efficient air conditioning system design. For example, a compressor having an increased volume reservoir is provided to hold a charge during prolonged periods of acceleration or constant driving speed conditions of the engine.

In additional or alternative embodiments, one or more supplementary reservoirs are provided with a compressor to hold a charge during prolonged periods of acceleration or constant driving speed conditions of the engine before decelerating. According to still another embodiment, a compressor having increased capacity is provided to optimize the compression of refrigerant in the reservoir to hold a charge during prolonged periods of acceleration or constant driving speed conditions of the engine. According to yet still another embodiment of the present invention, a dynamic pressure sensor is provided to allow for dynamic regulation of the pressurization system. According to further still another embodiment of the present invention, a secondary pressure sensor such as a pressure switch is provided which can be retrofit onto existing components of standard air conditioning systems.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
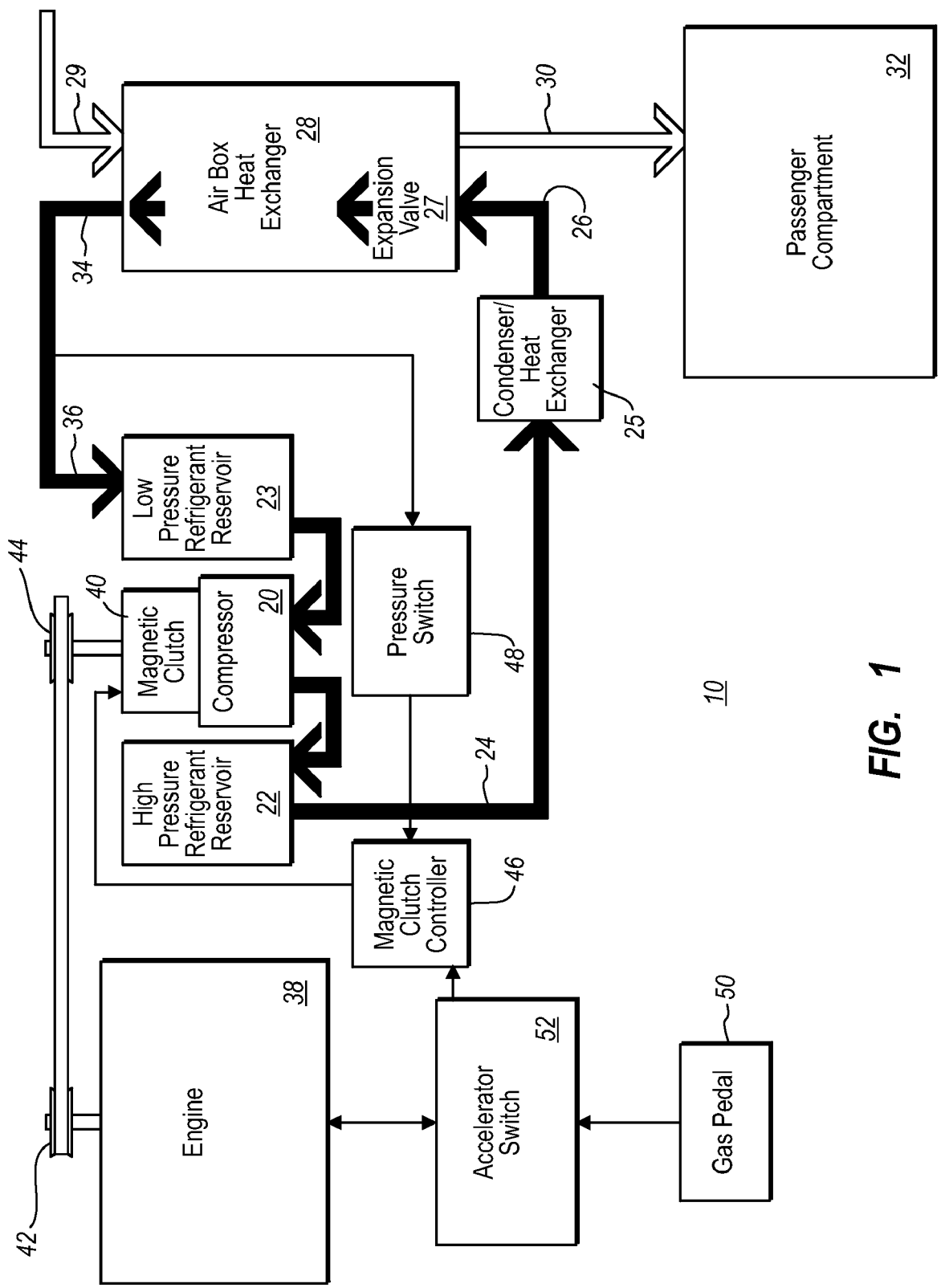
FIG. 1 is a block diagram of components of an automotive air conditioning system configured to allow for efficient pressurization of an air conditioning refrigerant.

Implementations of the present invention relate to systems, methods, and apparatus for improving the vehicle fuel efficiency when compressing an air conditioner refrigerant for use in an air conditioning system of a motor vehicle.

According to one or more implementations of the present invention, when the pressurization of the refrigerant of the air conditioning system drops below a desired level, it is determined whether the engine of the motor vehicle is decelerating. When the engine of the motor vehicle is decelerating, such as when the driver's foot is off the gas pedal, a pressurization system is actuated to draw power from the motor vehicle engine to charge the refrigerant (i.e., operate the air conditioning system compressor) of the air conditioning system. The pressurization system utilizes energy from the decelerating motor to increase the pressurization of the refrigerant in the air conditioning system.

According to one embodiment of the present invention, utilizing energy from the engine of the motor vehicle during deceleration to operate the air conditioning system compressor results in significant vehicle fuel efficiency gains. Drawing power from the engine during deceleration does not reduce performance of the engine output, or result in added fuel consumption, such as is experienced when a load is placed on the engine during acceleration (or while traveling at constant speeds). The load applied to the engine during deceleration can also help slow the vehicle, and can actually result in savings in braking effort, time, and force.

According to another embodiment of the present invention, when the pressurization of the refrigerant in the air conditioning system is below a desired level of pressurization and the engine is decelerating, a clutch, or other pressurization system component, can draw power from the decelerating engine. The power drawn from the decelerating engine can be utilized to increase the pressurization of the refrigerant in the air conditioning system. According to one embodiment of the present invention, the pressurization of the refrigerant in the air conditioning system is ascertained for the high pressure side of the system. Optionally, the pressurization of the refrigerant in the air conditioning system on the high pressure side of the system is monitored by determining the pressurization of the refrigerant on the low pressure side of the system. In another embodiment, the pressurization of the refrigerant on the high pressure side of the system can be monitored directly.

According to another embodiment of the present invention, a dual-mode system is provided. The dual-mode system can optionally charge the air conditioning system in the absence of a deceleration cycle while also allowing for efficient compression of the refrigerant during deceleration of the motor vehicle. For example, when the pressurization of the refrigerant on the high pressure side of the air conditioning system is less than a minimum level, the pressurization system is actuated to increase the pressurization of the refrigerant in the air conditioning system, even when the engine is not decelerating.

Optionally, when the engine is not decelerating, the refrigerant in the air conditioning system will be compressed until the pressurization reaches an intermediate value (e.g., an acceleration pressurization maximum value). The intermediate value can be less than the maximum pressurization limit to maintain capacity for additional pressurization when deceleration of the engine occurs. When the pressure in the air conditioning system is greater than the minimum level, but less than a maximum pressurization, the pressurization system is actuated only when the engine is decelerating.

As will be appreciated by those skilled in the art, a variety of types and configurations of air conditioning systems can be utilized without departing from the scope and spirit of the present invention. For example, according to one embodiment of the present invention, an efficient automotive air conditioning system is provided as part of the original auto vehicle design. According to another embodiment of the present invention, an automotive air conditioning system is provided that can be retrofit as an after market component for traditional automotive air conditioning systems.

According to another embodiment of the present invention, one or more components of the automotive air conditioning system are tailored to provide greater efficiencies in connection with a dual-mode or other efficient air conditioning system design. For example, a compressor having an increased volume reservoir is provided to hold a charge during prolonged periods of acceleration or constant driving speed conditions of the engine.

In additional or alternative embodiments, one or more supplementary reservoirs are provided with a compressor to hold a charge during prolonged periods of acceleration or constant driving speed conditions of the engine before decelerating. According to still another embodiment, a compressor having increased capacity is provided to optimize the compression of refrigerant in the reservoir to hold a charge during prolonged periods of acceleration or constant driving speed conditions of the engine. According to yet still another embodiment of the present invention, a dynamic pressure sensor is provided to allow for dynamic regulation of the pressurization system. According to further still another embodiment of the present invention, a secondary pressure sensor such as a pressure switch is provided which can be retrofit onto existing components of standard air conditioning systems.

FIG. 1 is block diagram of an air conditioning system for use in a motor vehicle, according to one embodiment of the present invention. In the illustrated embodiment, the system 10 comprises a compressor 20 having a high pressure refrigerant reservoir 22, a condenser/heat exchanger 25, an air box heat exchanger 28, and a plurality of components for pressurizing the refrigerant in the refrigerant reservoir 22. In general, compressor 20 is also communicatively coupled with a low pressure refrigerant reservoir 23.

As implied by their names, the refrigerant in refrigerant high pressure reservoir 22 will generally be in a state of greater compression than that in low pressure refrigerant reservoir 23. The specific refrigerant pressure(s) in reservoirs 22 and 23, however, can vary from one operating environment to the next. Furthermore, the specific type of refrigerant can also vary from one implementation to the next. For example, a manufacturer can select any refrigerant, such as one designed to cool when expanded, including such commonly known refrigerants as "FREON," R-12, and/or R-134.

In any event, the refrigerant in high pressure reservoir 22 is compressed to a desired pressurization parameter. The pressurization parameter of the refrigerant is typically dictated according to known design variables of the compression system, the particular refrigerant being utilized in the system, and/or the type of heat exchanger utilized. The pressurization parameters can also be dictated based on the air conditioning heat load encountered during operation, and/or other variables that affect the operating parameters of the system.

Once compressed, the refrigerant exits the refrigerant reservoir 22 at a point 24 and passes into condenser/heat exchanger 25. Condenser/heat exchanger 25 then cools the temperature of the compressed refrigerant. In other words, the refrigerant at points 24 and 26 is prepared (compressed and cooled) to be utilized in heat exchanger 28. After being cooled, the refrigerant then flows from the condenser/heat exchanger 25 to air box heat exchanger 28, such as at point 26. At point 24 and point 26, the refrigerant has compression parameters that are largely similar to those of the refrigerant in reservoir 22. Accordingly, reservoir 22 and points 24 and 26 generally represent the "high pressure side" of air conditioning system 10, while reservoir 23 and points 34 and 36 generally present the "low pressure side" thereof.

The heat exchanger 28 then passes the refrigerant through any number of components configured for efficient thermal transfer (e.g., countercurrent heat exchange) between the refrigerant and the incoming air. For example, when the refrigerant enters heat exchanger 28, the refrigerant is expanded through a refrigerant expansion valve 27, or other known refrigerant expansion mechanisms. Expansion of refrigerant in heat exchanger 28 provides the cooling properties of the refrigerant in the air conditioning system. The refrigerant then passes within the heat exchanger 28 through any number of coils, tubing, or other known heat exchange components, which allow the expanded refrigerant to absorb heat from the incoming air. This absorption of heat occurs along most, if not all, points along the heat exchanger 28 since, although gradually warming, the refrigerant generally remains cooler than the temperature of the incoming air.

Thus, as incoming air at point 29 enters heat exchanger 28, it is initially cooled a degree with refrigerant that has already passed through the substantial length of heat exchanger 28. Further along the heat exchanger 28, the air continues to cool incremental amounts as it continually transfers heat to gradually cooler, expanded refrigerant. (Conversely, the refrigerant continues to warm along the length of the heat exchanger 28 in the reverse direction.) As a result, the incoming air at point 30 is typically much cooler than at point 29, and is generally suited for cooling passenger compartment 32. The corollary, of course, is that the refrigerant that is exiting (or is about to exit) the heat exchanger 28 (i.e., at point 34) will have much warmer temperature parameters compared with its temperature at its entry points 26, 27.

Furthermore, the expanded refrigerant at point 34 also has lower pressure parameters than at points 24 and 26. Generally, the lower pressure of the refrigerant at points 24 and 26 is such that the refrigerant will not be efficient (compared with refrigerant on the high pressure side) at cooling incoming air without additional compression. This is despite the fact that the pressurization of refrigerant volume in the low pressure reservoir 23 tends to increase due to the increase in refrigerant volume on the low pressure side. Of course, when there is too much refrigerant on the low pressure side of the air conditioning system, this means there has been a corresponding decrease or depletion in refrigerant volume and pressurization of compressed refrigerant on the high pressure side (i.e., reservoir 22, and points 24 and 26). As previously discussed, as the volume (and corresponding pressurization) of refrigerant decreases on the high pressure side, the efficiency by which the refrigerant can cool incoming air is reduced.

Accordingly, embodiments of the present invention a number of ways for appropriately determining refrigerant parameters on the low pressure side of the air conditioning system and/or on the high pressure side. As shown in FIG. 1, for example, pressurization on the low pressure side is measured by pressure switch 48, which, in turn, at least indirectly drives engagement of magnetic clutch 40. For example, when the pressure switch 48 identifies that the refrigerant on the low pressure side of the system has reached certain upper pressure limits, the magnetic clutch 40 is engaged, and power from the engine 38 is translated to compressor 20.

Refrigerant volume is then pulled from the low pressure side of the system (which reduces refrigerant volume and pressure on the low pressure side), and compressed in compressor 20. Compressor 20 then passes the compressed refrigerant volume to the high pressure reservoir 22 (which increases the refrigerant pressurization and volume on the high pressure side). Once the pressure switch identifies that the pressurization of the refrigerant on the low and/or high pressure side of the system has reached an appropriate level, the magnetic clutch 40 is disengaged.

For example, FIG. 1 further illustrates an engine 38, which is operably connected to compressor 20 by means of a clutch 40 (e.g., "magnetic clutch"), and pulleys 42 and 44. Engine 38 is exemplary of motor vehicle engines which utilize fuel combustion, electrical power, or the like to provide power for desired motor vehicle operation. In the illustrated embodiment, a compressor 20 is operably linked to engine 38 by magnetic clutch 40. When the magnetic clutch 40 is engaged, a pulley 44 is actuated, and receives power from a pulley 42 of engine 38. Pulley 44, in turn, is linked to compressor 20 in a manner such that power from engine 38 is relayed to compressor 20 to allow for compression of refrigerant into reservoir 22.

A controller 46 (e.g., a "magnetic clutch controller") is operably linked to magnetic clutch 40. Magnetic clutch controller 46 is also linked to pressure switch 48, such that when the pressurization of the refrigerant in refrigerant reservoir 22 falls below a predetermined level (or alternatively, pressurization of refrigerant in reservoir 22b rises above a predetermined level), magnetic clutch controller 46 can actuate magnetic clutch 40. When magnetic clutch 40 is actuated, power from engine 38 is translated to compressor 20 by means of pulleys 42 and 44. As previously discussed, the pressurization of refrigerant in refrigerant reservoir 22 and the high side of the system can be determined based on the pressurization of refrigerant on the low side of the system utilizing pressure switch 48.

In the illustrated embodiment, a gas pedal 50 and an accelerator switch 52 are also provided. When a user presses on the gas pedal, accelerator switch 52 detects that the engine 38 is in a state of acceleration. When the user lets off the gas pedal, the accelerator switch 52 can also determine that the engine is in a state of deceleration. Deceleration of the engine can be defined as a state in which the engine is not accelerating or operating a constant speed. Deceleration of the engine can also be defined as a state when the torque of the vehicle drive shaft is in the opposite direction as during acceleration (or as constant speed).

Additionally, deceleration can be defined as a state in which braking of the vehicle is utilized to slow the rate of speed of the vehicle. Deceleration of the engine can be further defined as the state in which the engine is no longer powering the movement of the vehicle. Deceleration of the engine can also be defined as a state in which waste kinetic and/or potential energy is available, such as may occur when a vehicle is accelerating or traveling down a hill, but gravity, and not the engine, is powering such movement. Therefore, in certain circumstances, engine deceleration may occur when a vehicle is accelerating, such that the engine is being turned by the drive shaft with torque in the opposite direction as when accelerating on a level road.

In one implementation, deceleration of the engine 38 can be identified at magnetic clutch controller 46 by means of accelerator switch 52. When the engine is decelerating, the magnetic clutch controller 46 can engage the magnetic clutch 40, allowing energy from the decelerating engine 38 to be translated to compressor 20 by means of pulleys 42 and 44. In this manner, energy from the decelerating engine can be utilized to increase the pressurization of the refrigerant in the air conditioning system. Since the engine 38 is in a state of deceleration, energy which is utilized to pressurize the refrigerant in refrigerant reservoir 22 does not result in the same degree of increased energy output as would be the case if a load was placed on engine 38 during acceleration of the engine 38. According to one embodiment of the invention, no additional energy output of the engine is experienced when compressing refrigerant during deceleration of the engine.

As will be appreciated by those skilled in the art, a variety of types and configurations of efficient automotive air conditioning systems can be utilized without departing from the scope and spirit of the present invention. For example, according to one embodiment of the present invention, the pressure switch 48 comprises a high pressure side sensor. According to another embodiment of the present invention, a pressure sensor other than a pressure switch is utilized to detect the pressurization of the refrigerant in the reservoir.

According to another embodiment of the present invention, power from the engine 38 can be translated to the compressor 20 utilizing a mechanism other than a magnetic clutch and pulley system. According to another embodiment of the present invention, deceleration of the engine is detected utilizing a sensor other than an accelerator switch. According to another embodiment of the present invention, one or both of the acceleration sensor or pressure sensor are dynamically regulated based on the pressurization of the refrigerant in the refrigerant reservoir.

Figure 2:
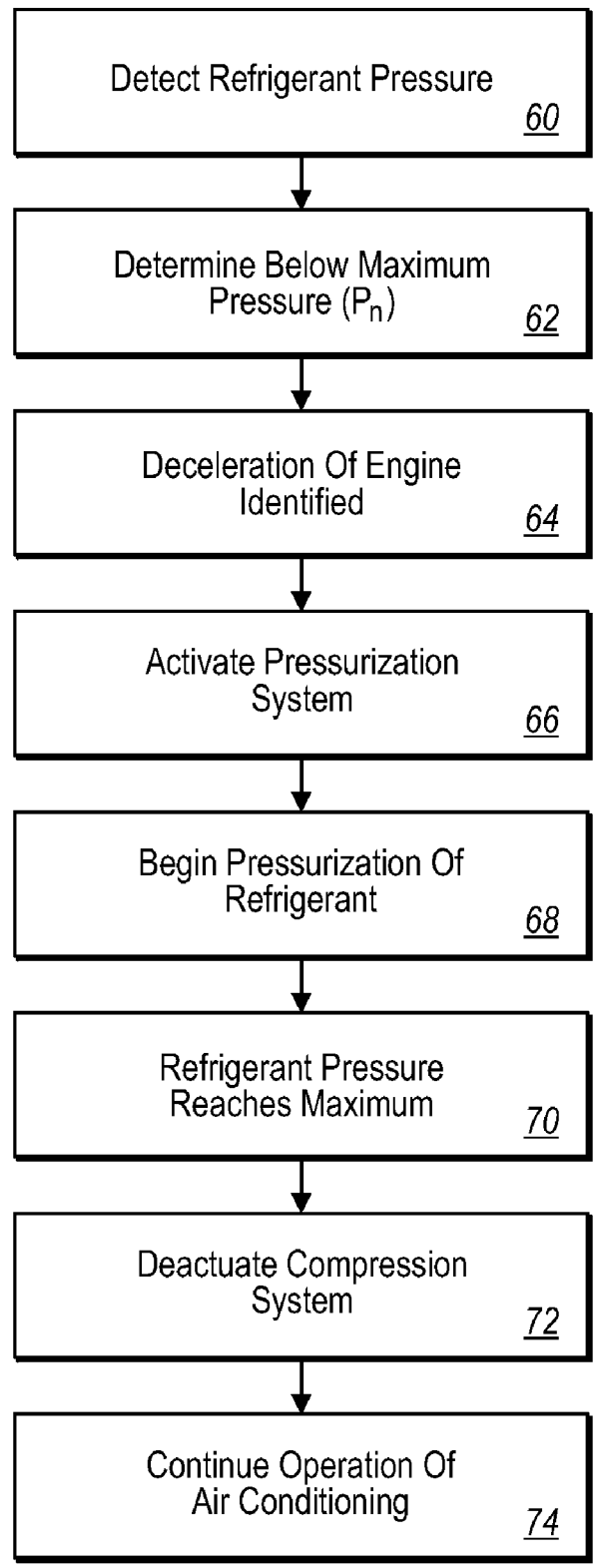
FIG. 2 is a flow diagram illustrating a method for efficient pressurization of an air conditioning refrigerant in an air conditioning system of an auto vehicle.

FIG. 2 is a flow diagram depicting an illustrative method for improving the energy efficiency in charging an air conditioner refrigerant for use in an air conditioning system of a motor vehicle according to one embodiment of the present invention. In the illustrated embodiment, pressurization of the refrigerant in the air conditioning system is detected in step 60. Subsequent to detecting the pressurization of the refrigerant in step 60, it is determined whether the pressurization of the refrigerant in the air conditioning system is below a maximum pressurization value ($P_h$) in step 62.

This can be monitored directly on the high pressure side of the system, indirectly on the low pressure side of the system, or in another position in the system. It is then identified whether the engine is in a state of deceleration in step 64. Subsequent to identifying that the engine is decelerating, a pressurization system which utilizes power from the engine is actuated in step 66. By utilizing power from the decelerating engine, additional energy output is not required to provide power to the pressurization system. This provides additional energy efficiency while providing for desired pressurization of the system.

Once the pressurization system is actuated, compression of the refrigerant is begun in step 68. The pressurization of the refrigerant reaches a maximum level in step 70. As mentioned throughout this specification, this pressure status can be monitored directly on the high pressure side of the system, indirectly on the low pressure side of the system, or in another position in the system. In any event, once the pressurization of the refrigerant reaches the maximum level, the pressurization system (which utilizes power from the engine to compress the refrigerant) is de-actuated in step 72. By de-actuating the pressurization system, power from the engine is no longer translated to the air conditioning compressor, and thus pressurization of the refrigerant is discontinued. Operation of the air conditioning system nevertheless continues in step 74.

As will be appreciated by those skilled in the art, a variety of types and configurations of methods for efficient operation of the automotive air conditioning system can be utilized without departing from the scope and spirit of the present invention. For example, according to one embodiment of the present invention, pressurization of the refrigerant only continues as long as the engine is decelerating. According to another embodiment of the present invention, the pressurization system comprises an engine pulley and magnetic clutch combination. According to another embodiment of the present invention, deceleration of the engine is identified before it is determined that the pressurization of the refrigerant is below the maximum desired pressurization.

Figure 3:
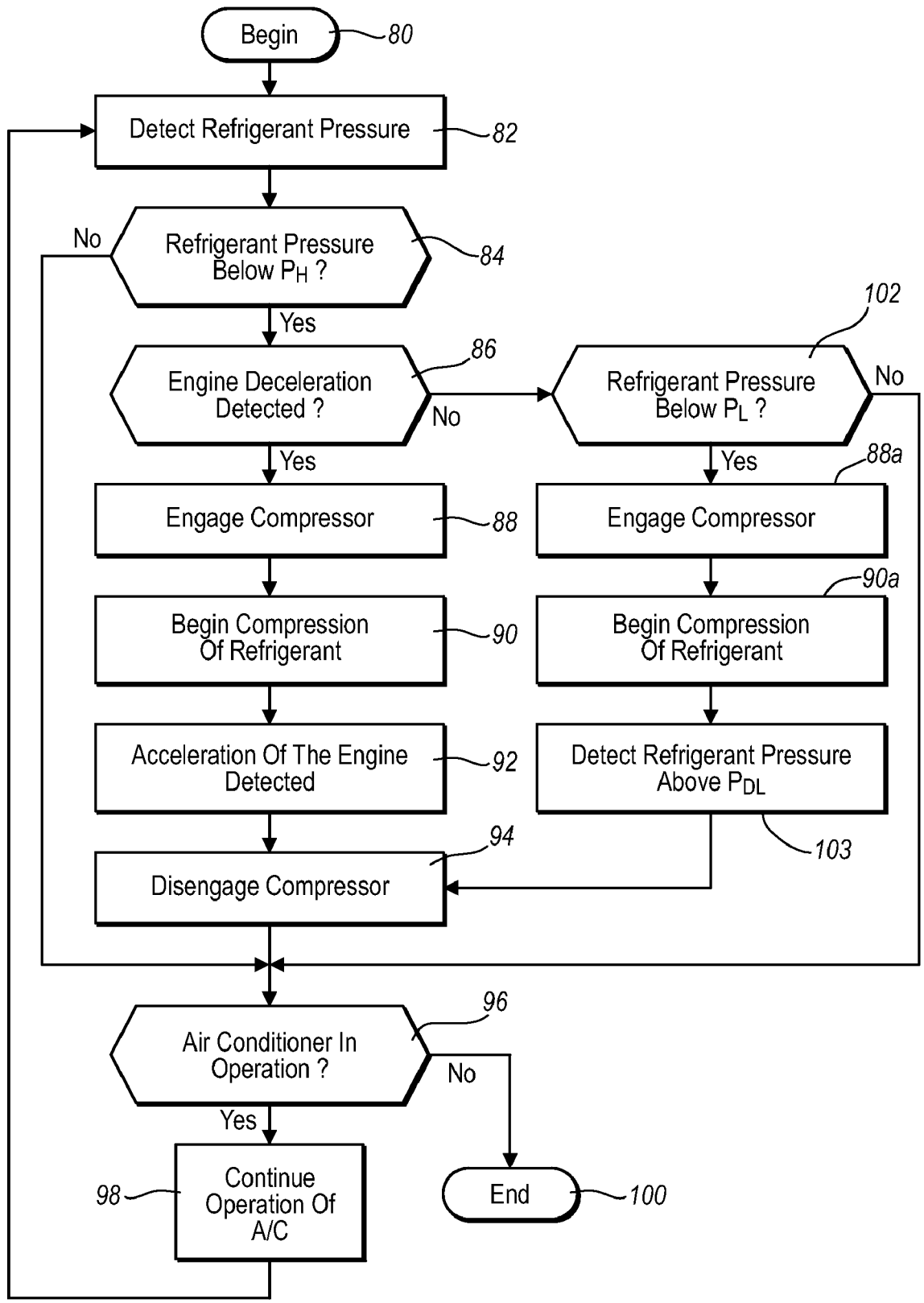
FIG. 3 is a logic flow diagram illustrating a method for dynamically pressurizing a refrigerant of an air conditioning system in a dual-mode manner.

FIG. 3 is a flow diagram illustrating a method for improving efficiency in charging an air conditioner refrigerant for use in an automotive air conditioning system. In the illustrated embodiment, the method begins in step 80. The pressurization of the refrigerant is detected in step 82. The pressurization of the refrigerant can be monitored directly on the high pressure side of the system, indirectly on the low pressure side of the system, or in another position in the system. Subsequent to detecting the pressurization of the refrigerant, it is determined whether the pressurization of the refrigerant is below 400 pounds per square inch (psi) (or other appropriate pressurization maximum value for a system) on the high pressure side of the system in a decision step 84. One will appreciate that reference herein to 400 psi (or any other specific pressure values) is provided as an exemplary value for at least one implementation of an air conditioning system.

In any event, if the refrigerant pressurization is not below 400 psi, the system bypasses steps 86-94 and advances directly to step 96 which will be discussed in greater detail hereinafter. In the event that the refrigerant pressure is below 400 psi or other pressurization maximum value, it is identified whether an engine deceleration event is detected in a decision step 86. In the event that an engine deceleration is detected, a compressor (e.g., 20) is actuated in a step 88. For example, the compressor can be actuated by engaging of a magnetic clutch (e.g., 40) of the engine. Engaging of the magnetic clutch allows for translation of power from the decelerating engine to an engine pulley which provides power to allow for compression of the refrigerant.

Subsequent to engaging the magnetic clutch, pressurization of the refrigerant in the automotive air conditioning system begins in step 90. Acceleration of the engine (e.g., 38) is then detected in a step 92. In some cases, deceleration of the engine and subsequent acceleration of the engine can occur in a fairly short time frame, and in a repetitive manner. For example, such acceleration and deceleration can occur during stop and go traffic, in a local area where there are many stop lights and/or stop signs, on roads having many curves and turns, or in other related acceleration and deceleration related events.

Subsequent to detecting an acceleration of the engine, the magnetic clutch is disengaged in step 94, such that a load is no longer placed on the engine. Subsequent to disengaging the magnetic clutch in step 94, it is determined whether the air conditioner is still in operation in a decision step 96. In the event that the air conditioner is not still in operation, the method ends in a step 100. In the event that the air conditioner is still in operation, operation of the automotive air conditioning unit continues in a step 98, and the pressurization of the refrigerant of the automotive air conditioning system is detected (i.e., in a repeat of step 82).

Returning to decision step 86, in the event that a deceleration of the engine has not occurred, it is next determined whether the refrigerant pressurization is below 200 psi (or other minimum pressurization threshold value appropriate for a system) in a step 102. As previously mentioned, the pressurization of the refrigerant can be monitored directly on the high pressure side of the system, indirectly on the low pressure side of the system, or in another position in the system. When a refrigerant pressurization in an automotive air conditioning system is below 200 psi in this example, a magnetic clutch operably linked to the engine is engaged in a step 88a. Subsequent to engaging the magnetic clutch, compression of the refrigerant in the automotive air conditioning system begins in a step 90a.

After compression of the refrigerant begins, after an amount of time, the system will detect that the refrigerant pressurization is above an exemplary intermediate pressure of about 250 psi (or other intermediate/acceleration pressurization maximum value) in a step 103. When the refrigerant pressurization is detected above 250 psi, the system disengages the magnetic clutch in a step 94. After disengaging the magnetic clutch in step 94, the method continues through steps 96, 98, and/or 100, as previously described. Returning to decision step 102, in which it is determined whether the pressurization of the refrigerant in the automotive air conditioning system is below 200 psi, in the event that the refrigerant pressurization is not below 200 psi, steps 88a, 90a, 103, and 104 are circumvented and the system proceeds directly to step 96 in which it is determined whether the air conditioner is still in operation.

By allowing for compression of the refrigerant in the absence of a deceleration of the engine, minimum pressurization parameters which facilitate proper operation of the air conditioning system are maintained. Nevertheless, maintaining pressurization of the refrigerant, during periods in which no deceleration event has occurred, to an intermediate value (e.g., a maximum of 250 psi) can minimize the load that will be placed on the engine. In particular, maintaining a maximum intermediate pressurization value (e.g., 250 psi) in the absence of deceleration of the engine can minimize load on the engine during periods in which the increased load would result in additional energy consumption and reduced fuel efficiency of the motor vehicle. Additionally, by pressurizing the air conditioning system to a maximum of 250 psi, an amount of pressurization capacity is maintained in the air conditioning system to allow for additional pressurization of the air conditioning system during a subsequent deceleration event.

In particular, FIG. 3 illustrates an embodiment in which a maximum pressurization of 400 psi is allowed on the high pressure side of the system during deceleration of the engine. However, a maximum pressurization of 250 psi is allowed when the engine is not decelerating. In other words, in light of the 200 psi pressurization minimum, in the event that the engine is not in a deceleration mode, the pressurization of the refrigerant on the high pressure side of the air conditioning system is maintained between 250 psi and 200 psi. Thus, when the engine begins to decelerate, the pressurization in the air conditioning system can be increased from 250 psi to 400 psi. As a result, pressurization capacity is maintained for compression of the refrigerant during deceleration when no direct energy consumption—with its attendant additional engine fuel consumption—is required.

As will be appreciated by those skilled in the art, a variety of types and configurations of methods for efficiently pressurizing refrigerant in an air conditioning system can be utilized without departing from the scope and spirit of the present invention. For example, in one embodiment a minimum pressurization other than 200 psi is utilized. In another embodiment, an intermediate (e.g., or acceleration/constant speed maximum) pressure value other than 250 psi is utilized. In still another embodiment, a maximum pressurization other than 400 psi is utilized as the maximum pressurization value. In another embodiment, deceleration of the engine is identified before pressurization of the refrigerant is determined. In yet another embodiment, pressurization of the refrigerant automatically occurs subsequent to engaging the magnetic clutch.

In another embodiment, pressurization of the refrigerant is provided by a compressor, which is powered from the drive shaft of the vehicle. In another embodiment, pressurization can also or alternatively be provided from a counter shaft located within the vehicle transmission. In another embodiment, pressurization of the refrigerant is provided by a mechanism other than the magnetic clutch and engine pulley combination. In another embodiment, engine events in which power can be transferred for pressurization of the refrigerant are identified and utilized for pressurizing the refrigerant when the engine is not decelerating.

Figure 4:
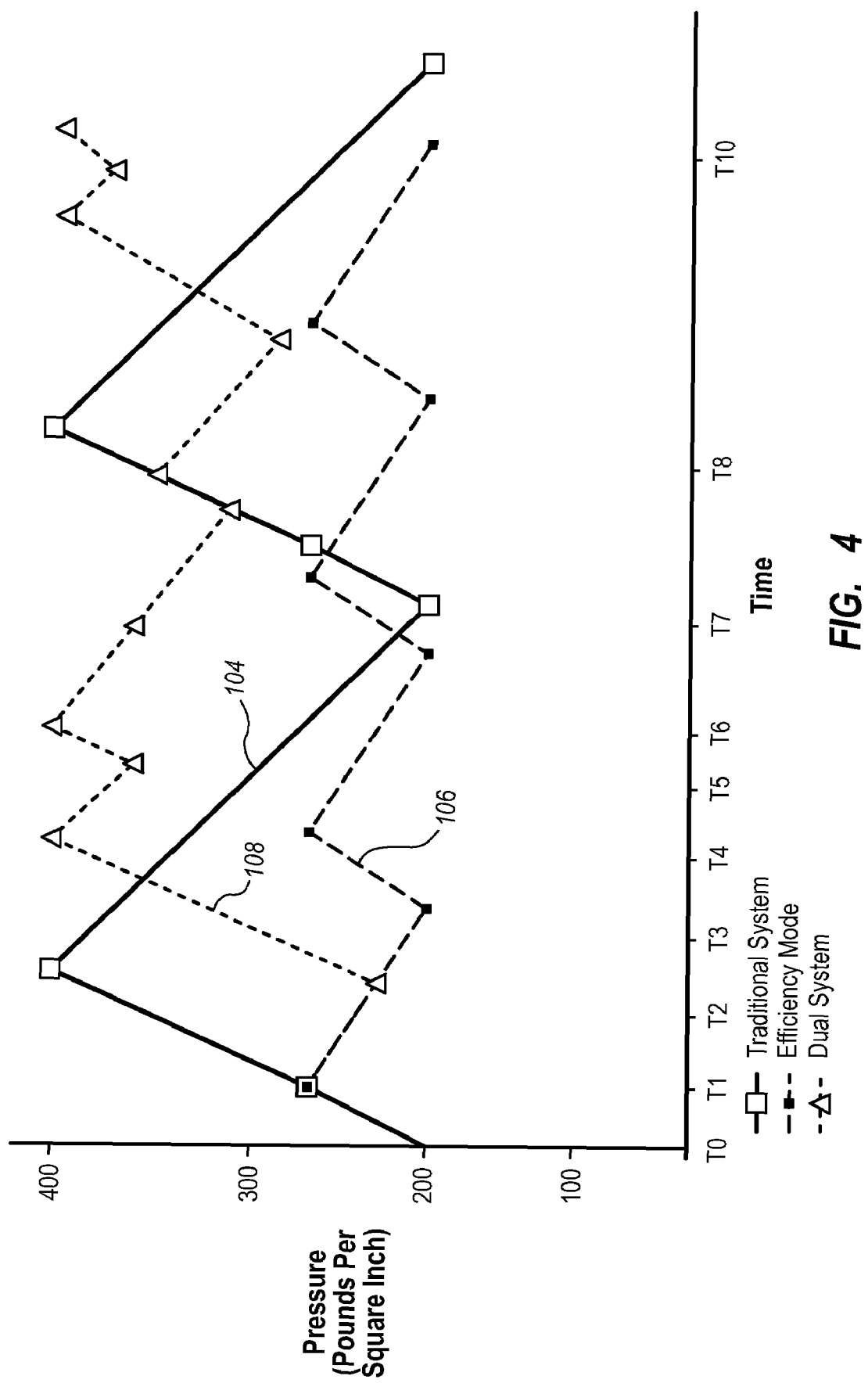
FIG. 4 is a graphic illustrating pressurization of a refrigerant utilizing different methods and systems, according to one embodiment of the present invention.

FIG. 4 is a graphic illustrating pressurization of refrigerant in an air conditioning system utilizing different systems and methods of pressurization. In the illustrated embodiment, the pressurization of the refrigerant on the high pressure side of the system is depicted for illustrative purposes. Additionally, the graphic depicts pressurization of the refrigerant over time. Pressurization in the system is depicted on the Y axis in pounds per square inch (in a range of 400 psi) with time being depicted on the X axis. Pressurization of refrigerant is also depicted in a traditional system 104, an efficiency mode 106, and a dual-mode system 108. As will be appreciated by those skilled in the art, the current, illustrative systems are included for exemplary purposes only, and should not be considered to be limiting in nature.

In the traditional system 104, pressurization of the refrigerant begins at a minimum pressurization of 200 psi. Compression of the refrigerant begins increasing the pressurization of the refrigerant from a pressurization minimum of 200 psi toward a pressurization maximum of 400 psi. Once the pressurization of the refrigerant reaches 400 psi, pressurization of the refrigerant is discontinued, and operation of the air conditioning system is allowed to continue. During operation of the air conditioning system, pressurization in the system is gradually lost over a period of time, such that the pressurization of the refrigerant in the air conditioning system eventually returns to approximately 200 psi.

In the illustrated embodiment, pressurization and depressurization are depicted as linear in nature to more clearly and simply illustrate a pressurization and depressurization cycle. As will be appreciated by those skilled in the art, pressurization and depressurization are products of a number of factors that can significantly alter the actual pressurization over time. Nevertheless, the illustrated graphic can be helpful to understand the nature of the pressurization and depressurization cycle.

Once pressurization in the traditional system 104 has returned to approximately 200 psi, compression of the refrigerant in the air conditioning system is again commenced to increase the pressurization in the system. From approximately time T7 to time T8, the pressurization in the system is increased from 200 psi to 400 psi, again returning the pressurization in the air conditioning system to approximately the maximum pressurization. Once the pressurization has reached the maximum pressurization of 400 psi at time T8, compression to increase the pressurization in the air conditioning system is de-actuated. Between time T8 and T10, the pressurization of the refrigerant gradually declines during operation of the air conditioning system.

In the illustrated embodiment of the present invention, an efficiency mode 106 is also depicted. Efficiency mode 106 represents compression of a refrigerant in the air conditioning system of a motor vehicle when the motor vehicle is accelerating or, in other words, in the absence of a deceleration cycle in the engine of the motor vehicle. In the illustrated embodiment, the pressurization of the refrigerant begins at the example pressure of about 200 psi. The refrigerant is then compressed to increase the pressurization in the air conditioning system such that at a time T1, the pressurization of the system reaches approximately 250 psi (the example intermediate pressure). Once the pressurization reaches 250 psi, compression of the refrigerant is de-actuated.

Of course, operation of the air conditioning system can be allowed to continue even when compression is no longer occurring. As a result, FIG. 4 shows that the pressurization of the refrigerant gradually declines from about 250 psi to approximately about 200 psi over an amount of time. Once the pressurization of the refrigerant in the air conditioning system approaches 200 psi (and no deceleration is detected), compression of the refrigerant is again actuated to increase the pressurization to return the pressurization to approximately 250 psi at approximately a time T4. The compression and decompression cycle corresponding with the efficiency mode leaves a compression capacity in the air conditioning system.

The compression capacity allows for pressurization of the refrigerant utilizing deceleration of the engine of the motor vehicle to increase the pressurization beyond the example intermediate pressure of about 250 psi to a pressurization maximum, such as an exemplary pressurization maximum of about 400 psi. The efficiency mode 106 thus represents a pressurization and depressurization cycle in the absence of compression utilizing deceleration of the engine of the motor vehicle. As will be appreciated by those skilled in the art, efficiency gains can also be realized by utilizing the efficiency mode in the absence of a compression utilizing deceleration or other waste kinetic or potential energy in the system.

In the illustrated embodiment, for example, a dual-mode pressurization is illustrated by dual system 108. In the illustrated embodiment, dual system 108 starts at an initial minimum pressurization of 200 psi. When the minimum pressurization of 200 psi is identified, pressurization of the refrigerant in the air conditioning system is actuated, and the air pressurization is increased to approximately 250 psi. Once the pressurization in the dual system 108 reaches 250 psi, compression of the refrigerant is de-actuated (i.e., no engine deceleration is available to otherwise rotate the engine/vehicle power train and then operate the compressor). Ongoing operation of the air conditioning system is nevertheless permitted, such that the pressure in the air conditioning system gradually decreases. In the illustrated embodiment, compression of the refrigerant in dual system 108 to a pressurization limit of 250 psi at time T1 may correspond with an acceleration cycle, or other form of active engine power (e.g., constant power output during constant speed).

As previously mentioned, therefore, the 250 psi pressurization limit in this example represents a maximum intermediate limit, such as an acceleration pressurization maximum value. The acceleration pressurization maximum value provides pressurization capacity in the system in the event a deceleration in the engine of the motor vehicle occurs. In the illustrated embodiment, deceleration of the engine occurs in the motor vehicle at approximately a time T2. At the beginning of the deceleration of the engine at time T2, compression of the refrigerant in the air conditioning system is again commenced to increase the pressurization of the refrigerant during the deceleration. In the illustrated embodiment, the pressurization in the air conditioning system is increased from approximately 220 psi to a maximum pressurization of approximately 400 psi at a time T4. The increase in pressurization from approximately 220 psi to approximately 400 psi corresponds with the deceleration of the engine (for which refrigerant pressurization is allowed beyond the intermediate value).

Once the maximum pressurization of 400 psi in the air conditioning system is reached, compression of the refrigerant is discontinued and the pressurization in the air conditioning system is allowed to gradually decrease during operation of the air conditioning system. Operation of the air conditioning system in cooling the ambient temperature of the passenger compartment of the motor vehicle has been previously described. As the pressurization begins to decrease, at approximately a time T5, the pressurization reaches a deceleration pressure minimum value of approximately 390 psi. As with every other pressure value discussed herein, the deceleration pressure minimum value of 390 psi is exemplary in nature for at least one implementation, and should not be considered to be limiting in nature.

In any event, the deceleration pressurization minimum value corresponds with a minimum refrigerant pressurization that is allowed during deceleration of the engine. In other words, during deceleration of the engine, pressurization on the high pressure side of the air conditioning system is maintained at near maximum levels. This maintains a desired high level of pressurization in the air conditioning system while the engine is decelerating. Additionally, providing a deceleration pressurization minimum value prevents continuous stopping and starting of the compression cycle when the compression cycle falls only a few psi below the pressurization maximum. In this manner, unnecessary fatigue on the system caused by continuous stopping and starting of the compression is prevented while also maintaining the pressurization at desired, optimized pressurization levels.

As previously discussed, when the pressurization of the refrigerant in the air conditioning system approaches 390 psi (or the established deceleration pressurization minimum), compression of the refrigerant is again resumed to increase the pressurization in the air conditioning system to the pressurization maximum of 400 psi at time T6. As a result, the dual system 108 allows for pressurization to occur in an efficient and optimized manner during deceleration of the motor vehicle to maintain compression in the system at near maximum levels during deceleration of the engine. At a time T6, when the pressurization maximum has again been reached, compression of the refrigerant is discontinued. The compression in the system begins to decrease as operation of the air conditioning system continues in the absence of additional compression in the system.

When the pressurization of the refrigerant in the air conditioning system again reaches the deceleration pressurization minimum shortly before a time T7, the engine of the motor vehicle is no longer decelerating. As a result, pressurization in the system is allowed to continue to decrease from the 390 psi to as low as the pressurization minimum of 200 psi. In the illustrated embodiment, shortly before a time T8, at approximately a pressurization of 300 psi, the engine of the motor vehicle again begins to decelerate. As a result, compression of the refrigerant again begins to increase the pressurization in the air conditioning system from 300 psi toward the pressurization maximum. In the illustrated embodiment, the length of the deceleration of the engine is somewhat constricted, such that a deceleration of the engine is discontinued at approximately a time T8. As a result, additional compression of the refrigerant in the motor vehicle is discontinued, and the pressurization of the refrigerant begins to decrease in the absence of such deceleration.

In this particular example, when the pressurization of the refrigerant falls below 300 psi, the engine again begins to decelerate, and compression of the refrigerant again resumes. The pressurization of the refrigerant again reaches the pressurization maximum of 400 psi due to the length of deceleration of the engine. Once the pressurization maximum of 400 psi is reached, compression is again discontinued and the pressurization in the system begins to drop. In the illustrated embodiment, recommencing of the pressurization of the refrigerant in the air conditioning system resumes before the deceleration minimum is reached. This is due to the fact that a short acceleration cycle occurred between the reaching of the maximum pressurization and recommencing of compression of the system. In other words, at the beginning of a new deceleration event, pressurization in the system is identified to be below the pressurization maximum value, and compression of the system is again commenced until the point at which the pressurization in the system again reaches the pressurization maximum of 400 psi.

In the illustrated embodiment, operation of the dual system 108 allows for maintaining of the pressurization of the refrigerant in the air conditioning system in the absence of a deceleration cycle in a very similar manner as that depicted with regard to the efficiency mode 106. When a deceleration event occurs, sufficient capacity exits in the system to allow for additional compression of the refrigerant above and beyond the efficiency mode maximum to a deceleration mode maximum, which is higher than the efficiency mode maximum. During multiple acceleration and deceleration events, compression of the pressurization of the refrigerant is allowed to operate to maximize deceleration events, in order to maximize pressurization of the refrigerant in the air conditioning system during such deceleration events.

As will be appreciated by those skilled in the art, a variety of types and configurations of air conditioning systems, including dual-mode systems, can be utilized without departing from the scope and spirit of the present invention. For example, according to one embodiment of the present invention, the pressurization values including the pressurization minimum value, the efficiency mode maximum value, the deceleration mode minimum value, and the maximum pressurization values are selected based on the particular design of the system, the type of refrigerant utilized, and other operating parameters corresponding with the air conditioning system, including ambient temperature, and the like. According to another embodiment of the present invention, values corresponding with low pressure side values are selected based on estimated corresponding pressure values on the high pressure side of the engine.

According to another embodiment of the present invention, compression of the refrigerant occurs during deceleration cycles without utilizing an efficiency mode. As a result, when pressurization in the system falls below the pressurization minimum value, a compression cycle is started. Compression of the system is continued until the pressurization maximum is reached. As the pressure in the system continues to decrease, the occurrence of a deceleration event will start compression to increase the pressurization of the system until the pressurization maximum is again detected. According to another embodiment of the present invention, the actuation of compression will not occur during a deceleration event until the pressurization in the system falls below the deceleration pressurization minimum value.

Figure 5:
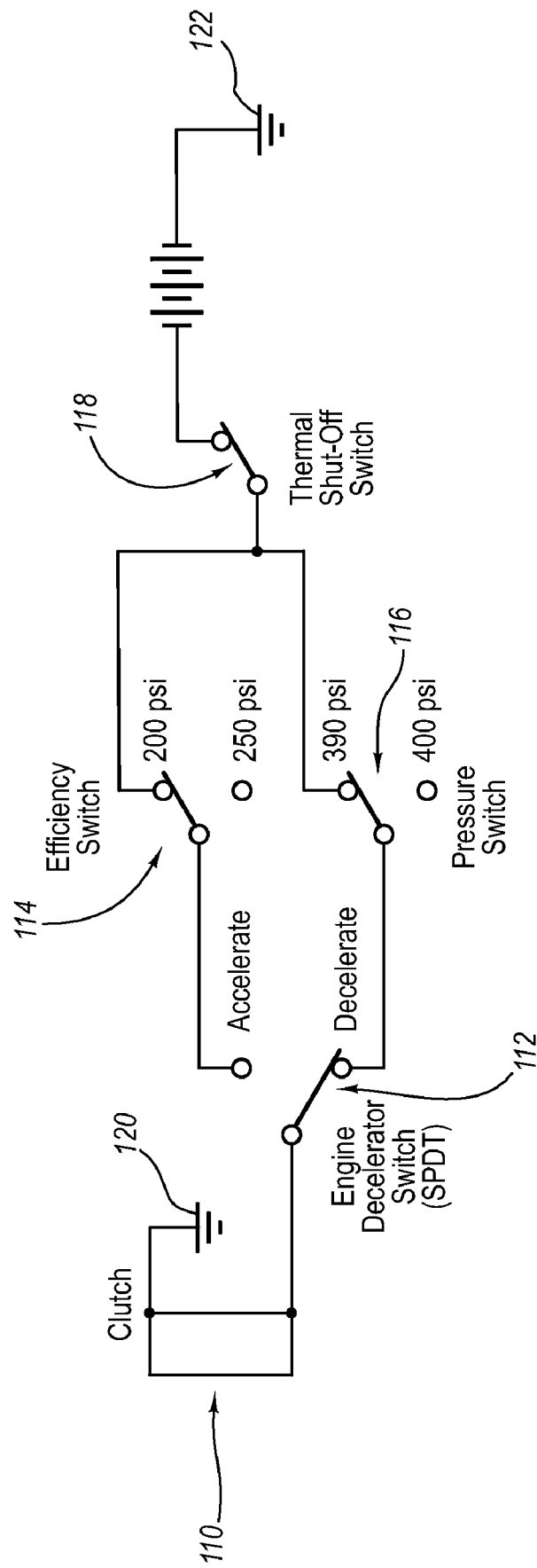
FIG. 5 is a schematic of a circuit utilized to efficiently pressurize an air conditioning system, according to one embodiment of the present invention.

FIG. 5 is a schematic of an electronic circuit utilized in connection with an air conditioning system configured to efficiently compress an air conditioner refrigerant in an air conditioning system. In the illustrated embodiment, a clutch 110 is depicted. Clutch 110 is linked to an accelerator switch 112. Accelerator switch 112 provides an indication of whether an engine of the motor vehicle is accelerating or decelerating. When the engine is accelerating, the accelerator switch 112 is in contact with an accelerate contact of the accelerator switch 112. When the engine is decelerating, the accelerator switch 112 is in contact with a decelerator contact of the accelerator switch 112. As will be appreciated by those skilled in the art, switching between accelerate contact and decelerate contact can occur in response to one or more conditions other than traditional acceleration or deceleration of the engine. For example, switching to decelerate contact can occur in any instance in which waste kinetic or potential energy can be utilized to operate the compressor.

In the illustrated embodiment, the accelerator switch 112 comprises a Single Pole, Double Throw ("SPDT") switch, which provides alternating contact between the accelerating and decelerating mode. As will be appreciated by those skilled in the art, a different switch configuration, which provides an indication of acceleration and deceleration, can also or alternatively be provided. In any event, when the illustrated accelerator switch 112 is in the accelerate mode and in contact with the accelerate contact, clutch 110 is placed in connection with an efficiency switch 114.

Efficiency switch 114 provides an indication of the pressurization of the refrigerant in the air conditioning system. In the illustrated embodiment, when the pressurization of the refrigerant on the high pressure side of the air conditioning system exceeds an exemplary pressurization of 250 psi, efficiency switch 114 is opened preventing engaging of clutch 110. When the pressurization of the refrigerant in the air conditioning system of less than 200 psi, the efficiency switch 114 closes allowing for engaging of the clutch 110. Engaging of clutch 110 results in transferring of power from the motor vehicle engine to the compressor, which power is utilized to compress the refrigerant in the air conditioning system.

When the accelerator switch 112 indicates that the engine is decelerating, and is in contact with the decelerate contact (as is shown in the illustrated embodiment), clutch 110 is placed in contact with pressure switch 116. Pressure switch 116 thus provides an indication of the pressurization of the refrigerant on the high pressure side in the air conditioning system. When the engine is decelerating, as is indicated by the accelerator switch 112, pressure switch 116 allows for maximization of the pressurization of the refrigerant in the air conditioning system. In the illustrated embodiment, when the pressurization of the refrigerant on the high pressure side of the air conditioning system reaches a maximum pressurization, such as the illustrated exemplary pressurization of 400 psi, the high pressure switch 116 opens.

Opening of pressure switch 116 prevents additional engagement of clutch 110 in a manner that would result in additional compression of the refrigerant in the air conditioning system. When the pressurization of the refrigerant falls to below 390 psi, which in the illustrated embodiment represents a deceleration pressurization minimum value, pressure switch 116 is closed. Closing of the pressure switch 116 engages clutch 110, resulting in actuation of the compressor, and an increase in pressurization of the refrigerant on the high pressure side of the air conditioning system. In this manner, when the accelerator switch 112 indicates that the engine is decelerating, pressurization in the air conditioning system is maintained at near maximum values by the pressure switch 116.

In the illustrated embodiment, a thermal shut-off switch 118 is also provided. Thermal shut-off switch 118 provides an indication that the engine or other relevant motor vehicle component is overheating (or approaching a high temperature limit). Typically, such excessive heating in the air conditioning system occurs as a result of one or a plurality of factors. In any event, additional engine and or heat load exerted by air conditioning system in the absence of the deceleration cycle can contribute to overheating of the engine or other system components. As a result, thermal shut-off switch 118 opens when the temperature of the engine exceeds or approaches a dangerous or upper threshold.

In one embodiment, thermal shut-off switch 118 can minimize additional burden on the radiator system of the motor vehicle by the air conditioning system that can also slow cooling of the engine or other system components. As a result, clutch 110 is prevented from being engaged, minimizing any additional load that could be exerted on the engine to charge the refrigerant in the air conditioning system (or other factor that could contribute to overheating of the engine). In the illustrated embodiment, a ground 120 and a ground 122 are also depicted. Ground 120 is provided in connection with clutch 110 to maintain a safe electrical connection between clutch 110 and the components of the system. Similarly, ground 122 is in connection with thermal shut-off switch 118 to maintain a safe connection with the components of the system in the operating environment.

As will be appreciated by those skilled in the art, a variety of types and configurations of electronic circuitry can be provided to allow for efficient charging of an air conditioner refrigerant as part of an air conditioning system without departing from the scope and spirit of the present invention. For example, according to one embodiment of the present invention, the thermal shut-off switch is configured to operate only when the engine is accelerating such that the thermal shutoff does not prevent actuating of the compressor during deceleration of the engine.

According to another embodiment of the present invention, rather than providing switch-type sensors to indicate the pressurization and/or acceleration/deceleration mode of the engine, non-switch type sensors are provided. According to another embodiment of the present invention, dynamic sensors such as digital, analog, or other mechanisms that provide an indication of the pressurization of the refrigerant in the system are provided. According to another embodiment of the present invention, additional components are provided to allow control of compression, or other desired functionality of the system, including software, microprocessors, or the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A dual-mode air conditioning system for use in an automobile comprising:
   a first refrigerant compression operating mode functioning at or below a first pressure;
   a second refrigerant compression operating mode functioning at or below a third pressure and at or above a fourth pressure;
   at least one pressure switch for identifying the pressurization of a refrigerant and for selecting one of the first and second refrigerant compression operating modes, wherein one of the first and second refrigerant compression operating modes is utilized during deceleration of an engine of the automobile.

2. The dual-mode system as recited in 1, wherein the third pressure comprises an acceleration maximum value.

3. The dual-mode system as recited in 1, wherein the fourth pressure comprises a minimum pressurization value for the dual-mode system.

4. The dual-mode system as recited in 1, wherein the second refrigerant compression operating mode is selected during powering of the automobile by the engine during acceleration or constant speed.

5. The dual-mode system as recited in 1, wherein the first pressure comprises a maximum pressurization value.

6. The dual-mode system as recited in 5, wherein the dual-mode system is configured to engage the first compression mode at any pressure below the first pressure, and further configured to engage the second compression mode at or between the third and fourth pressures.

7. The dual-mode system as recited in 1, further comprising a second pressure that less than the first pressure, wherein the second pressure comprises a deceleration minimum value.

8. The dual-mode system as recited in 7, wherein the first pressure and the second pressure have a higher pressure value than the third pressure and the fourth pressure.

9. The dual-mode system as recited in 7, wherein the dual-mode system is configured to engage the first compression mode at or below the second pressure, and further configured to engage the second compression mode only at or between the third and fourth pressures.

10. The dual-mode system as recited in 1, further comprising a second pressure, wherein the first pressure comprises a maximum pressurization value, the second pressure comprises a deceleration minimum value, the third pressure comprises an acceleration maximum value, and the fourth pressure comprises a minimum pressurization value for the dual-mode system.

11. The dual-mode system as recited in 10, wherein the acceleration maximum value is less than the deceleration minimum value.

12. The dual-mode system as recited in 10, wherein the acceleration maximum value is less than the maximum pressurization value.

13. The dual-mode system as recited in 12, wherein a difference in pressurization between the acceleration maximum value and the maximum pressurization maintains capacity to allow for additional pressurization of a refrigerant during deceleration of the engine.

14. A dual-mode air conditioning system for use in an automobile comprising:
   a first refrigerant compression operating mode functioning at or below a first pressure, wherein the first refrigerant comprises a maximum pressurization value;
   a second refrigerant compression operating mode functioning at or below a third pressure and at or above a fourth pressure; and
   at least one switch for selecting one of the first and second refrigerant compression operating modes, wherein the at least one switch is configured to select the first compression mode at any pressure below the first pressure and to select the second compression mode at or between the third and forth pressures, wherein one of the first and second refrigerant compression operating modes is utilized during deceleration of an engine of the automobile.

15. A dual-mode air conditioning system for use in an automobile comprising:
   a first refrigerant compression operating mode functioning at or below a second pressure less than a maximum pressurization value;
   a second refrigerant compression operating mode comprising a deceleration minimum value and functioning at or below a third pressure and at or above a fourth pressure, wherein the third and fourth pressures are less than the second pressure; and
   at least one switch for selecting one of the first and second refrigerant compression operating modes, wherein the at least one switch is configured to select the first compression mode at or below the second pressure and to select the second compression mode only at or between the third and fourth pressures, wherein one of the first and second refrigerant compression operating modes is utilized during deceleration of an engine of the automobile.

* * * * *

UNITED STATES PATENT AND TRADEMARK OFFICE
CERTIFICATE OF CORRECTION

PATENT NO.       : 7,380,405 B2
APPLICATION NO.  : 11/678785
DATED            : June 3, 2008
INVENTOR(S)      : Harrison It is certified that error appears in the above-identified patent and that said Letters Patent is hereby corrected as shown below:

Column 3
Line 32, change "tends" to --tend--

Column 4
Line 63, change "retrofit" to --retrofitted--

Column 7
Line 30, change "FIG 1 is block" to --FIG 1 is a block--
Line 36, change "in the refrigerant reservoir" to --in the high pressure refrigerant reservoir--

Column 8
Line 40, change "24 and 26" to --34 and 36--
Line 56, change "present invention a" to --present invention include a--

Column 9
Line 29, change "22b" to --23--

Column 12
Line 26, change "104" to --94--

Column 16
Line 35, change "sufficient capacity exits" to --sufficient capacity exists--

UNITED STATES PATENT AND TRADEMARK OFFICE
CERTIFICATE OF CORRECTION

PATENT NO. : 7,380,405 B2
APPLICATION NO. : 11/678785
DATED : June 3, 2008
INVENTOR(S) : Harrison It is certified that error appears in the above-identified patent and that said Letters Patent is hereby corrected as shown below:

Column 17
Line 30, change "decelerating mode" to --decelerating modes--
Lines 42, 45, and 46 change "engaging" to --engagement--
Line 43, change "clutch" to --the clutch--
Line 44, change "conditioning system of less than 200 psi" to --conditioning system is less than 200 psi--

Column 18
Line 18, change "by air conditioning system" to --by the air conditioning system--

Column 19
Line 34, in Claim 7 change "that less" to --that is less--

Signed and Sealed this

Twenty-third Day of June, 2009

JOHN DOLL
*Acting Director of the United States Patent and Trademark Office*